United States Patent
Petersson et al.

(10) Patent No.: US 11,962,378 B2
(45) Date of Patent: Apr. 16, 2024

(54) POLARIZED RECEPTION OF REFERENCE SIGNALS AT A TERMINAL DEVICE

(71) Applicant: Telefonaktiebolaget LM Ericsson (publ), Stockholm (SE)

(72) Inventors: Sven Petersson, Sävedalen (SE); Andreas Nilsson, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 28 days.

(21) Appl. No.: 17/914,001

(22) PCT Filed: Mar. 30, 2020

(86) PCT No.: PCT/EP2020/059008
§ 371 (c)(1),
(2) Date: Sep. 23, 2022

(87) PCT Pub. No.: WO2021/197575
PCT Pub. Date: Oct. 7, 2021

(65) Prior Publication Data
US 2023/0353204 A1    Nov. 2, 2023

(51) Int. Cl.
*H04B 7/06* (2006.01)
*H04B 7/10* (2017.01)

(52) U.S. Cl.
CPC .......... *H04B 7/0617* (2013.01); *H04B 7/063* (2013.01); *H04B 7/10* (2013.01)

(58) Field of Classification Search
CPC ......... H04B 7/0617; H04B 7/063; H04B 7/10
See application file for complete search history.

(56) References Cited

U.S. PATENT DOCUMENTS

| | | | |
|---|---|---|---|
| 2018/0183509 A1* | 6/2018 | Luo | H04B 7/01 |
| 2020/0367230 A1* | 11/2020 | Raghavan | H04L 5/0035 |
| 2020/0396035 A1* | 12/2020 | Yu | H04L 5/006 |
| 2022/0029676 A1* | 1/2022 | Ramireddy | H04B 7/0626 |

OTHER PUBLICATIONS

International Search Report and Written Opinion issued in International Application No. PCT/EP2020/059008 dated Oct. 30, 2020 (10 pages).
Sony, "Enhancements on multi-beam operation", 3GPP TSG RAN WG1#98 meeting, R1-1908784, Prague, CZ, Aug. 2019 (9 pages).
Qualcomm, "Breaking the wireless barriers to mobilize 5G NR mmWave", Jan. 2019 (39 pages).

* cited by examiner

*Primary Examiner* — Dac V Ha
(74) *Attorney, Agent, or Firm* — Rothwell, Figg, Ernst & Manbeck, P.C.

(57) ABSTRACT

There is provided mechanisms for polarized reception of reference signals. A method is performed by a terminal device. The terminal device is equipped with an antenna array having dual-polarized antenna elements. The antenna array is connected to a baseband chain in the terminal device. The method comprises receiving, during a beam management procedure with a TRP, two reference signals transmitted in one OFDM symbol each from the same TRP port within a slot. The two reference signals are received using a filter with a first polarization for a first of the two reference signals and with a second polarization for a second of the two reference signals. The second polarization is orthogonal to the first polarization.

17 Claims, 6 Drawing Sheets

POLARIZED RECEPTION OF REFERENCE SIGNALS AT A TERMINAL DEVICE

CROSS REFERENCE TO RELATED APPLICATIONS

This application is a 35 U.S.C. § 371 National Stage of International Patent Application No. PCT/EP2020/059008, filed 2020 Mar. 30.

TECHNICAL FIELD

Embodiments presented herein relate to a method, a terminal device, a computer program, and a computer program product for polarized reception of reference signals.

BACKGROUND

In communications networks, there may be a challenge to obtain good performance and capacity for a given communications protocol, its parameters and the physical environment in which the communications network is deployed.

For example, for future generations of mobile communications networks, frequency bands at many different carrier frequencies could be needed. For example, low such frequency bands could be needed to achieve sufficient network coverage for wireless devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node of the network and at the wireless devices might be required to reach a sufficient link budget.

Narrow beam transmission and reception schemes might be needed at such high frequencies to compensate the expected high propagation loss. For a given communication link, a respective beam can be applied at both the network-end (as represented by a network node or its transmission and reception point, TRP) and at the terminal-end (as represented by a terminal device), which typically is referred to as a beam pair link (BPL). A BPL (i.e. both the beam used by the network node and the beam used by the terminal device) is expected to be discovered and monitored by the network using measurements on downlink reference signals, such as channel state information reference signals (CSI-RS) or synchronization signal block (SSB) signals, used for beam management.

A beam management procedure can be used for discovery and maintenance of beam pair links. In some aspects, the beam management procedure is defined in terms of a P-1 sub-procedure, a P-2 sub-procedure, and a P-3 sub-procedure.

The CSI-RS for beam management can be transmitted periodically, semi-persistently or aperiodically (event triggered) and they can be either shared between multiple terminal devices or be device-specific. The SSB are transmitted periodically and are shared for all terminal devices. In order for the terminal device to find a suitable network node beam, the network node, during the P-1 sub-procedure, transmits the reference signal in different transmission (TX) beams on which the terminal device performs measurements, such as reference signal received power (RSRP), and reports back the N best TX beams (where N can be configured by the network). Furthermore, the transmission of the reference signal on a given TX beam can be repeated to allow the terminal device to evaluate a suitable reception (RX) beam. Reference signals that are shared between all terminal devices served by the TRP might be used to determine a first coarse direction for the terminal devices. It could be suitable for such a periodic TX beam sweep at the TRP to use SSB as the reference signal. One reason for this is that SSB are anyway transmitted periodically (for initial access/synchronization purposes) and SSBs are also expected to be beamformed at higher frequencies to overcome the higher propagation losses noted above.

A finer beam sweep in more narrow beams than used during the P-1 sub-procedure might then be performed at the network node during a P-2 sub-procedure to determine a more detailed direction for each terminal device. Here, the CSI-RS might be used as reference signal. As for the P-1 sub-procedure, the terminal device performs measurements, such as reference signal received power (RSRP), and reports back the N best TX beams (where N can be configured by the network).

Furthermore, the CSI-RS transmission in the transmission beam selected during the P-2 sub-procedure can be repeated in a P-3 sub-procedure to allow the terminal device to evaluate suitable RX beams at the terminal device.

However, in some aspects, which beam in the respective beam management sub-processes is reported and/or selected by a terminal device as the best beam (e.g., in terms of RSRP) to some extent depends on the antenna architecture at the terminal device. Such aspects are not considered during current beam management procedures.

Hence, there is still a need for improved beam management procedures.

SUMMARY

An object of embodiments herein is to provide beam management procedures that take into account the antenna architecture at the terminal device.

According to a first aspect there is presented a method for polarized reception of reference signals. The method is performed by a terminal device. The terminal device is equipped with an antenna array having dual-polarized antenna elements. The antenna array is connected to a baseband chain in the terminal device. The method comprises receiving, during a beam management procedure with a TRP, two reference signals transmitted in one orthogonal frequency-division multiplexing (OFDM) symbol each from the same TRP port within a slot. The two reference signals are received using a filter with a first polarization for a first of the two reference signals and with a second polarization for a second of the two reference signals. The second polarization is orthogonal to the first polarization.

According to a second aspect there is presented a terminal device for polarized reception of reference signals. The terminal device is equipped with an antenna array having dual-polarized antenna elements. The antenna array is connected to a baseband chain in the terminal device. The terminal device further comprises processing circuitry. The processing circuitry is configured to cause the terminal device to receive, during a beam management procedure with a TRP, two reference signals transmitted in one OFDM symbol each from the same TRP port within a slot. The two reference signals are received using a filter with a first polarization for a first of the two reference signals and with a second polarization for a second of the two reference signals. The second polarization is orthogonal to the first polarization.

According to a third aspect there is presented a terminal device for polarized reception of reference signals. The terminal device is equipped with an antenna array having dual-polarized antenna elements. The antenna array is connected to a baseband chain in the terminal device. The terminal device further comprises a receive module configured to receive, during a beam management procedure with a TRP, two reference signals transmitted in one OFDM symbol each from the same TRP port within a slot. The two reference signals are received using a filter with a first polarization for a first of the two reference signals and with a second polarization for a second of the two reference signals. The second polarization is orthogonal to the first polarization.

According to a fourth aspect there is presented a computer program for polarized reception of reference signals, the computer program comprising computer program code which, when run on a terminal device equipped with an antenna array having dual-polarized antenna elements, the antenna array being connected to a baseband chain in the terminal device, causes the terminal device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these aspects enable the beam management procedures to take into account the antenna architecture at the terminal device.

Advantageously, these aspects improve the beam management procedure.

Advantageously, these aspects improve the beam management procedure by enabling improvement in the beam selection at the terminal device.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
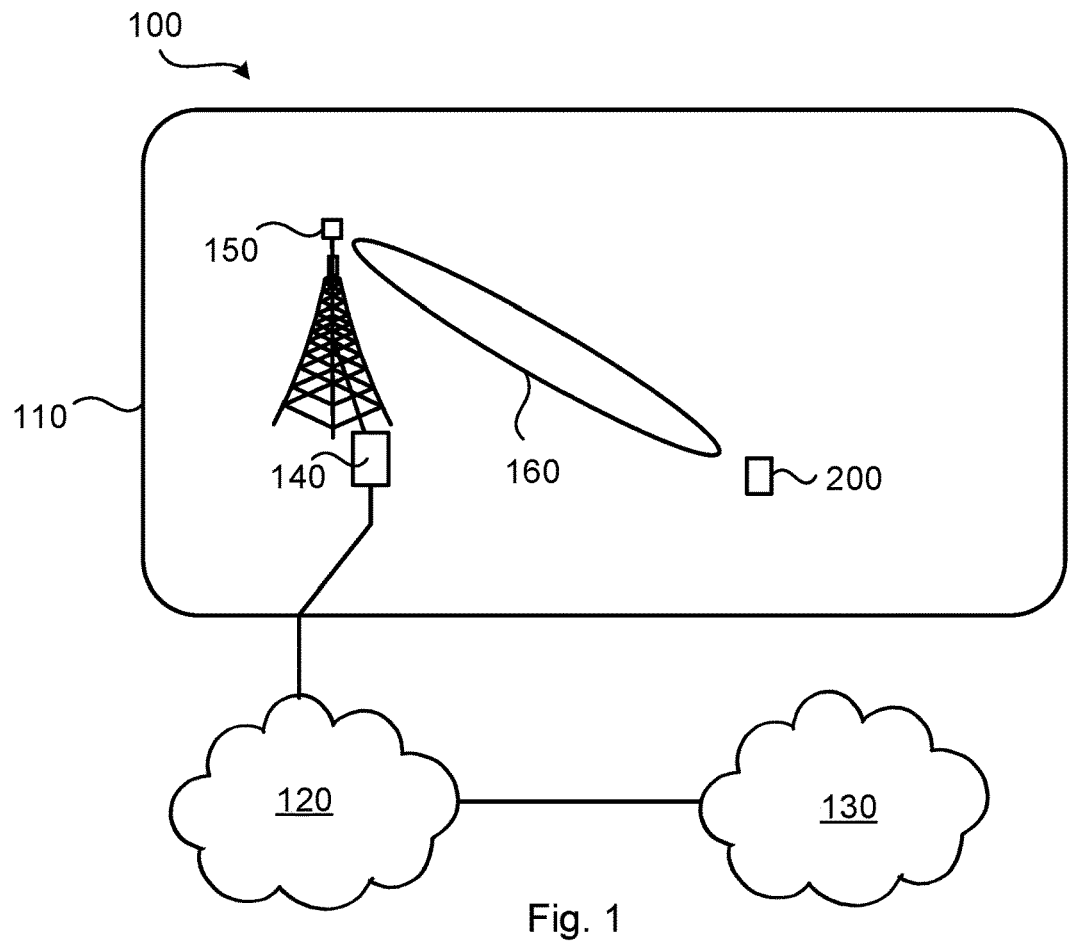
FIG. 1 is a schematic diagram illustrating a communication network according to embodiments.

FIG. 1 is a schematic diagram illustrating a communication network 100 where embodiments presented herein can be applied. The communication network 100 could be a third generation (3G) telecommunications network, a fourth generation (4G) telecommunications network, a fifth generation (5G) telecommunications network, or any evolvement thereof, and support any 3GPP telecommunications standard, where applicable.

The communication network 100 comprises a network node 140 configured to provide network access to terminal devices, as represented by terminal device 200, in a radio access network 110. The radio access network 110 is operatively connected to a core network 120. The core network 120 is in turn operatively connected to a service network 130, such as the Internet. The terminal device 200 is thereby enabled to, via the network node 200, access services of, and exchange data with, the service network 130.

The network node 140 comprises, is collocated with, is integrated with, or is in operational communications with, a transmission and reception point (TRP) 150. The network node 140 (via its TRP 150) and the terminal device 200 is configured to communicate with each other in beams, one of which is illustrated at reference numeral 160. In this respect, beams that could be used both as TX beams and RX beams will hereinafter simply be referred to as beams.

Examples of network nodes 140 are radio access network nodes, radio base stations, base transceiver stations, Node Bs, evolved Node Bs, g NBs, access points, access nodes, and backhaul nodes. Examples of terminal devices 200 are wireless devices, mobile stations, mobile phones, handsets, wireless local loop phones, user equipment (UE), smartphones, laptop computers, tablet computers, network equipped sensors, network equipped vehicles, and so-called Internet of Things devices.

There could be different types of antenna arrangements that the terminal device 200 is provided with in order for the terminal device 200 to efficiently communicate with the TRP 150. In this respect, an antenna panel might be defined as a rectangular antenna array of dual-polarized antenna elements with typically one transmit/receive unit (TXRU) per polarization. An analog distribution network with phase shifters can be used to steer a directional beam as generated at each such antenna panel. Alternatively, the terminal device 200 is configured for digital wideband (time domain beamformed) beamforming that mimics the operation and function of the analog distribution network. Multiple antenna panels might be stacked next to each other and digital beamforming can be performed across the antenna panels. For the terminal device 200, depending on its physical orientation, signals might arrive and emanate from all different directions. Hence, it might be beneficial to have an antenna implementation at the terminal device 200 which is enabled to generate omni-directional-like coverage for the terminal device 200 in addition to high gain narrow directional beams. One way to increase the omni-directional coverage at the terminal device 200 is to provide the terminal device 200 with multiple antenna panels, where at least two of the antenna panels have different pointing directions.

Figure 2:
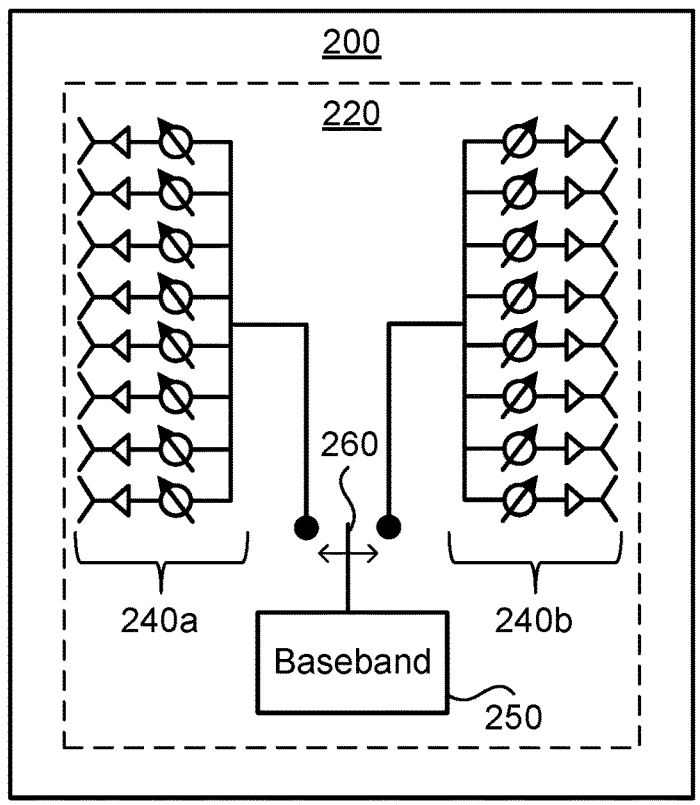
FIG. 2 schematically illustrates the antenna architecture of a terminal device according to an embodiment.

FIG. 2 schematically illustrates an example antenna architecture of the terminal device 200. According to the illustrated antenna architecture, the terminal device 200 is equipped with at least one antenna array 240a, 240b. Each antenna array 240a, 240b has dual-polarized antenna elements. In the illustrated example, each antenna array 240a, 240b has eight dual-polarized antenna elements but as the skilled person understands, each antenna array 240a, 240b might have less than eight dual-polarized antenna elements or more than eight dual-polarized antenna elements. The antenna arrays 240a, 240b are connectable to a baseband chain 250 in the terminal device 200 (via a switch 260). In some examples the terminal device 200 is equipped with more than one antenna array 240a, 240b. Then the two or more antenna arrays 240a, 240b could selectively be connected to one and the same baseband chain 250, one at a time. This enables the terminal device 200 to comprise just one single baseband chain 250 despite comprising two or more antenna arrays 240a, 240b. In other examples, the terminal device 200 comprises two or more baseband chains 250, where each baseband chain 250 is connectable to one or more antenna arrays 240a, 240b. This enables each antenna array 240a, 240b to have its own baseband chain 250. The antenna architecture might be part of a communications interface 220 of the terminal device 200.

Figure 3:
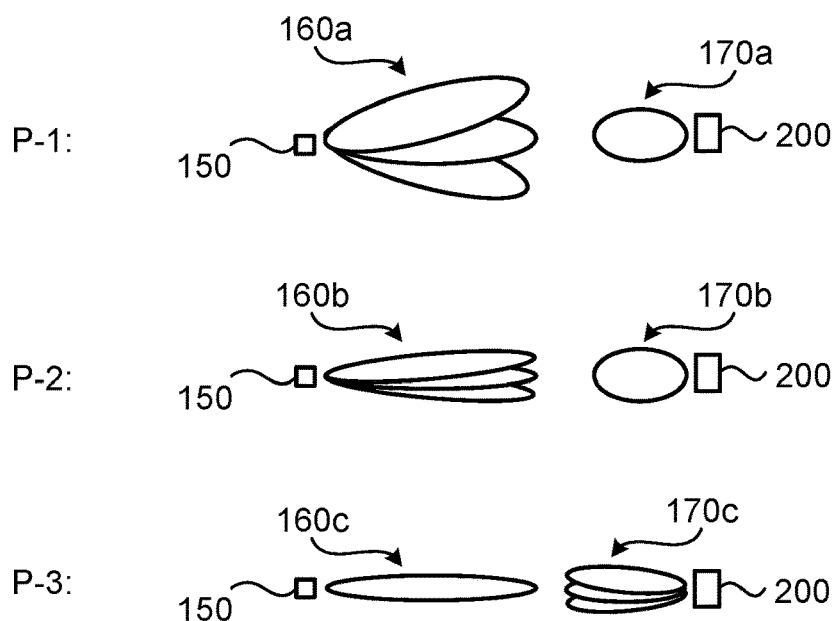
FIG. 3 schematically illustrates a beam management procedure according to embodiments.

As noted above there is still a need for improved beam management procedures. Reference is therefore made to FIG. 3 that schematically illustrates a beam management procedure consisting of three sub-procedures, referred to as P-1, P-2, and P-3 sub-procedures. These three sub-procedures will now be disclosed in more detail.

One main purpose of the P-1 sub-procedure is for the network node 140 to find a coarse direction towards the terminal device 200 by transmitting reference signals in wide, but narrower than sector, beams that are swept over the whole angular sector. The TRP 150 is expected to, for the P-1 sub-procedure, utilize beams, according to a spatial beam pattern 160a, with rather large beam widths. During the P-1 sub-procedure, the reference signals are typically transmitted periodically and are shared between all terminal devices 200 served by the network node 140 in the radio access network 110. The terminal device 200 uses a wide, or even omni-directional beam for receiving the reference signals during the P-1 sub-procedure, according to a spatial beam pattern 170a. The reference signals might be periodically transmitted channel state information reference signals (CSI-RS) or synchronization signal blocks (SSB). The terminal device might then to the network node 140 report the N≥1 best beams and their corresponding quality values, such as reference signal received power (RSRP) values. The beam reporting from the terminal device 200 to the network node 140 might be performed rather seldom (in order to save overhead) and can be either periodic, semi-persistent or aperiodic.

One main purpose of the P-2 sub-procedure is to refine the beam selection at the TRP 150 by the network node 140 transmitting reference signals whilst performing a new beam sweep with more narrow directional beams, according to a spatial beam pattern 160b, than those beams used during the P-1 sub-procedure, where the new beam sweep is performed around the coarse direction, or beam, reported during the P-1 sub-procedure. During the P-2 sub-procedure, the terminal device 200 typically uses the same beam as during the P-1 sub-procedure, according to a spatial beam pattern 170b. The terminal device 200 might then to the network node 140 report the N≥1 best beams and their corresponding quality values, such as reference signal received power (RSRP) values. One P-2 sub-procedure might be performed per each terminal device 200 or per each group of terminal devices 200. The reference signals might be aperiodically or semi-persistently transmitted CSI-RS. The P-2 sub-procedure might be performed more frequently than the P-1 sub-procedure in order to track movements of the terminal device 200 and/or changes in the radio propagation environment.

One main purpose of the P-3 sub-procedure is for terminal devices 200 utilizing analog beamforming, or digital wideband (time domain beamformed) beamforming, to find best beam. During the P-3 sub-procedure, the reference signals are transmitted, according to a spatial beam pattern 160c, in the best reported beam of the P-2 sub-procedure whilst the terminal device 200 performs a beam sweep, according to a spatial beam pattern 170c. The P-3 sub-procedure might be performed at least as frequently as the P-2 sub-procedure in order to enable the terminal device 200 to compensate for blocking, and/or rotation.

Due to the physical radio environment, which is reported as the best beam might be different for different polarizations. For example, for some non-line of sight (NLOS) radio propagation environments, what is reported as the strongest beam in one polarization might correspond to the weakest beam in the orthogonal polarization. One way to mitigate this is to switch the polarization of the beams at the TRP 150 between transmission of consecutive SSB. However, such switching might create problems for automatic gain control (AGC) as performed by the terminal device 200. On reason for this is due to that the received power of the two SSBs transmitted for the two orthogonal polarizations might differ too much, for example more than 10 dB.

One alternative way for the terminal device 200 to find its best beam, instead of using a P-3 sub-procedure is for the terminal device 200 to evaluate different beams during the periodic SSB transmission after initial network access. Since each SSB consists of four orthogonal frequency-division multiplexing (OFDM) symbols, a maximum of four beams can be evaluated during each SSB burst transmission. One benefit with this is that no extra overhead of CSI-RS transmission is needed. One drawback, however, with determining the beam to use at the terminal device 200 based on SSB transmission is that an SSB only has one TRP port, and hence only is transmitted over one polarization (per each unique direction), which implies that the terminal device 200 might only be able to evaluate suitable beams for one polarization. But as noted above, in case the RSRP differs significantly for different polarizations there is a risk that a non-optimal beam is selected at the terminal device 200.

The embodiments disclosed herein therefore relate to mechanisms for polarized reception of reference signals. In order to obtain such mechanisms there is provided a terminal device 200, a method performed by the terminal device 200, a computer program product comprising code, for example in the form of a computer program, that when run on a terminal device 200, causes the terminal device 200 to perform the method.

Figure 4:
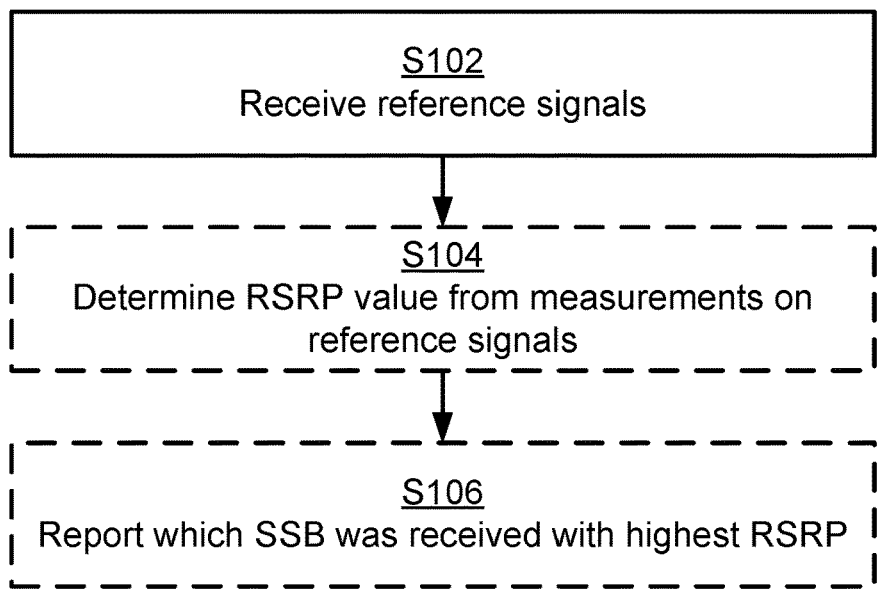
FIG. 4 is a flowchart of methods according to embodiments.

FIG. 4 is a flowchart illustrating embodiments of methods for polarized reception of reference signals. The methods are performed by the terminal device 200. The methods are advantageously provided as computer programs 820.

During the beam management procedure, the terminal device 200 receives two reference signals within the same slot using two different polarizations. In particular, the terminal device 200 is configured to perform step S102:

S102: The terminal device 200 receives, during a beam management procedure with a TRP 150, two reference signals transmitted in one OFDM symbol each from the same TRP port within a slot. The two reference signals are received using a filter with a first polarization for a first of the two reference signals and with a second polarization for a second of the two reference signals. The second polarization is orthogonal to the first polarization.

The beam management procedures thereby takes into account the antenna architecture at the terminal device 200.

Embodiments relating to further details of polarized reception of reference signals as performed by the terminal device 200 will now be disclosed.

If dual-polarized beamforming is used, the polarization will be different in different directions so there will not be one single polarization in all directions. This does not matter as long as the first polarization and the second polarization are orthogonal to each other.

In some aspects, the terminal device 200 might be configured to determine if, and if so how much, it has been rotated. The terminal device 200 might further be configured to, in case it is determined that the terminal device 200 has been rotated, evaluates the polarization state again. Hence, a rotation criterion can be applied by the terminal device 200 for evaluating its polarization state. In particular, according to an embodiment, each of the first polarization and the second polarization is defined by their own polarization state, and which polarization state that defines each of the first polarization and the second polarization depends on rotational orientation of the terminal device 200. Further, as long as the terminal device 200 has not rotated, there might not be any need for evaluation of different polarization states since the polarization state might not change as long as the terminal device 200 keeps its orientation. In particular, according to an embodiment, which polarization state that defines each of the first polarization and the second polarization remains unchanged as long as the rotational orientation of the terminal device 200 remains unchanged.

Embodiments according to which the polarization is changed at the terminal device 200 when receiving the reference signals in order to reduce the risk of polarization mismatch will now be disclosed. In some aspects, these embodiments can be readily combined with the above described P-1 sub-procedure.

In some aspects, the terminal device 200 calculates one quality value, such as RSRP, based on the reference signals as received in both OFDM symbols. That is, according to an embodiment, the terminal device 200 is configured to perform (optional) step S104:

S104: The terminal device 200 determines one common RSRP value from measurements as performed by the terminal device 200 on both the two reference signals.

In this respect, one individual RSRP value could first be determined for each of the two reference signals. The one common RSRP value could then be determined as the highest of these two individual RSRP values. Alternatively, the one common RSRP value could then be determined as an average of the two individual RSRP values.

As disclosed above, there could be different types of reference signals that the network node 140 transmits. In some examples, the two reference signals are received in an SSB. Further, in this, the SSB might in total comprise four reference signals as transmitted in one OFDM symbol each from the same TRP port within the slot. The one common RSRP value might then be determined from measurements as performed by the terminal device 200 on all the four reference signals. The RSRP of an SSB might, for example, be calculated based on a primary synchronization signal (PSS), a secondary synchronization signal (SSS) signal, demodulation reference signals (DMRS) that is frequency multiplexed with physical broadcast channel (PBCH) signalling, or even the control information symbols of the PBCH could be used. This means that 3 or 4 OFDM symbols of an SSB can be used by the terminal device 200 to determine the RSRP of that SSB.

When the herein disclosed embodiments are combined with the above described P-1 sub-procedure, the step of receiving reference signals and the step of determining an RSRP value might be repeated for each beam in the beam sweep. Hence, according to an embodiment, during the beam management procedure with the TRP 150, two further reference signals transmitted in one OFDM symbol each from the same TRP port are received. The two further reference signals are received using the filter with the first polarization for a first of the two further reference signals and with the second polarization for a second of the two further reference signals. One common RSRP value from measurements as performed by the terminal device 200 on both the two further reference signals is determined.

These two further reference signals might be transmitted in a different beam at the TRP 150 compared to the above referred to two reference signals. According to an embodiment, the two further reference signals are received in a further SSB.

The terminal device 200 might then report back to the network node 140, via the TRP 150, the SSB received with highest RSRP value (or highest other type of quality value). That is, according to an embodiment, the terminal device 200 is configured to perform (optional) step S106:

S106: The terminal device 200 reports, to the TRP 150, which of the SSBs was received with highest RSRP.

In some examples, all reference signals are received using the same beam at the terminal device. That is, according to an embodiment, the two reference signals are received using one and the same beam at the terminal device 200.

One non-limiting example of how these embodiments could be readily combined with the above described P-1 sub-procedure will now be disclosed.

Assume that the P-1 sub-procedure is based on transmission of reference signals in the form of SSBs. In this case the terminal device 200 will perform RSRP measurements on all different SSBs in an SSB burst and report the SSB index and corresponding RSRP of the N (1≤N<5) SSBs with highest RSRP. Since polarization mismatching might cause a sever drop in the received power, the terminal device 200 switches polarization of the beam used to receive the SSB during one SSB, so that the RSRP is calculated in at least one OFDM symbol for each of two orthogonal polarization. In this way the SSB beam selection reported to the TRP will be more reliable. For example, assume that there is a polarization mismatch between the TRP 150 and the terminal device 200 such that the received power becomes very poor, then the RSRP measurements might be very unreliable. Another example is that the terminal device 200 might experience line of sight (LOS) conditions towards the TRP 150, but due to polarization mismatch the RSRP for the LOS beam might yield poor RSRP, and an NLOS beam (e.g., a beam that is reflected on another object) that reach the terminal device 200 with changed polarization, might yield better RSRP. This might cause the terminal device 200 to select the NLOS beam, even though the LOS beam would have yield much higher RSRP if the TRP 150 and the terminal device 200 were not mismatched with respect to polarization.

Embodiments according to which the terminal device 200 evaluates reference signals received in different polarizations in different ways in order select not only the best beam but also polarization state for the beam will now be disclosed. In some aspects, these embodiments can be readily combined with the above described P-3 sub-procedure.

For a P-3 sub-procedure, when the network node 140 transmits reference signals in terms of CSI-RS, there can be two reference signals in each OFDM symbol by using two port CSI-RS resources.

There could be different ways for the terminal device 200 to evaluate the beams for different polarizations in different ways.

In some aspects, different spatial beam patterns are used when receiving the reference signals in the different polarizations. Particularly, according to an embodiment, the first of the two reference signals and the second of the two reference signals are received using mutually different spatial beam patterns. In this respect, the first of the two reference signals might be received using a first spatial beam pattern, the second of the two reference signals might be received using a second spatial beam pattern, where the second spatial beam pattern is different from to the first spatial beam pattern. As above, the first polarization is used when the first of the two reference signals is received and the second polarization is used when the second of the two reference signals is received. Thus the first spatial beam pattern is used for the first polarization and the second spatial beam pattern is used for the second polarization.

Figure 5:
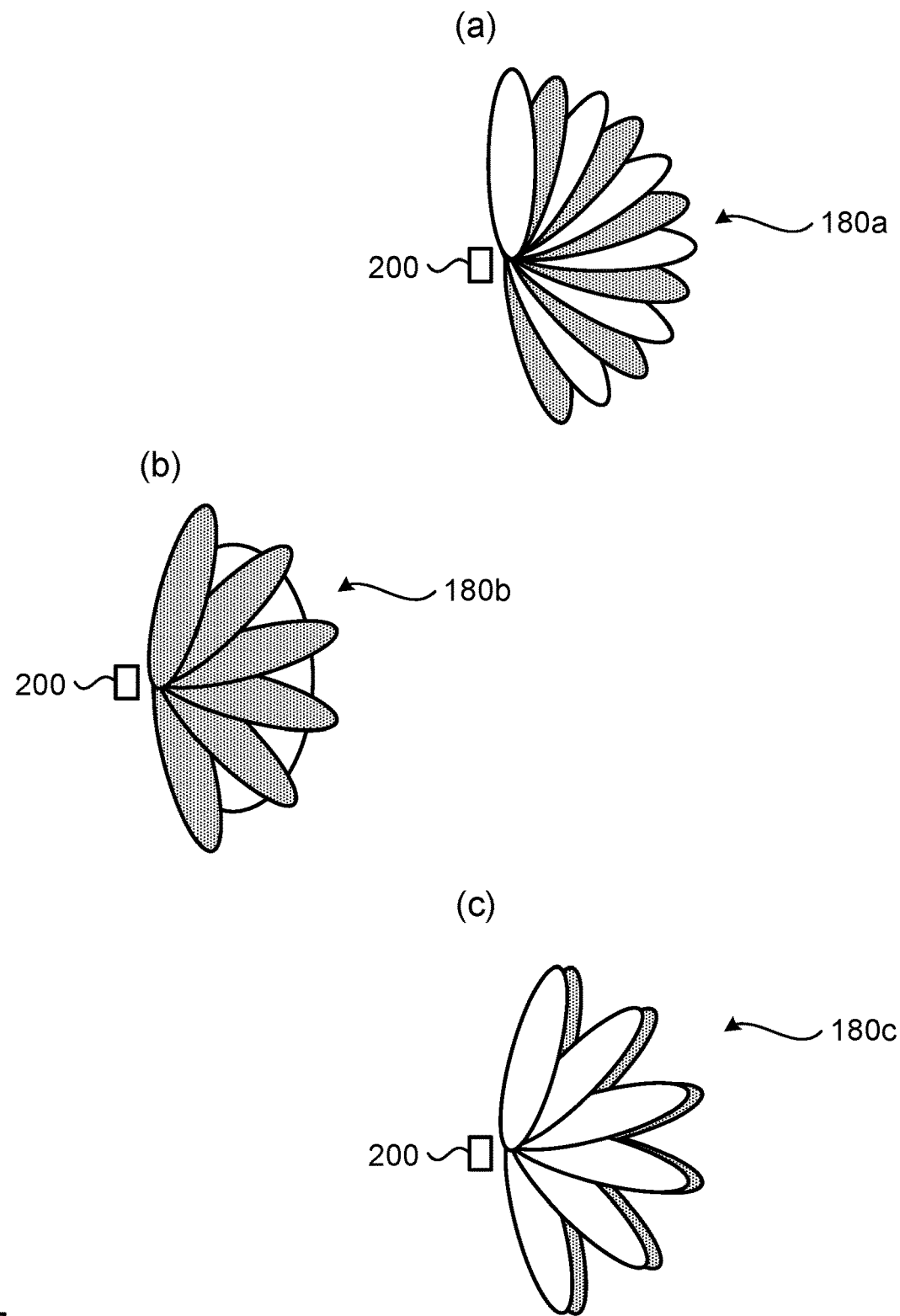
FIG. 5 schematically illustrates spatial beam patterns in different polarizations as generated by a terminal device according to an embodiment.

Parallel reference is here made to FIG. 5 which at (a), (b) and (c) illustrates three examples of spatial beam patterns 180a, 180b, 180c as generated by the terminal device 200 for the different polarizations P1 and P2. The spatial beam patterns for the different polarizations differ from each other in FIG. 5(a) and FIG. 5(b) but are the same in FIG. 5(c). Taking FIG. 5(a) as an example, narrow beams are generated where the polarization changes from beam to beam such that the polarization is orthogonal between adjacent beams. As long as there is some angular spread around the terminal device 200, even if there is a polarization mismatch between the TRP 150 and one of the polarizations of the beams in FIG. 5(a), it is likely that the RSRP will be sufficiently high for some of the beams of the other polarization well (depending e.g. on how dense the beams are located in the angular dimension). If the beams are generated from a two-times over-sampled discrete Fourier transform (DFT) grid of beams, then the drop in RSRP is rather small. It is also expected that the UE in UE capability signaling can report how many UE beams that it would like to evaluate during a beam management procedure, and in this case the UE can signal a number that gives a good enough distance between the beams. The example of FIG. 5(b) might correspond to a scenario where the terminal device 200 has earlier determined a preferred polarization state, and therefore most of the narrow beams are generated with this (first) polarization. However, to evaluate if the previously best polarization still is preferred, the terminal device 200 generates one wider beam in the orthogonal (second) polarization. In case for example the RSRP of the wide beam almost is the same as the strongest narrow beam, it is likely that the polarization of the wide beam is preferred, since that beam has lower gain. Taking FIG. 5(c) as an example, the terminal device 200 generates slightly wider beams compared to FIGS. 5(a) and 4(b), and receives the reference signals in each beam for both polarizations. In this way a preferred direction and polarization can be determined by the terminal device 200.

In some aspects, the spatial beam patterns differ from each other by having different pointing directions. That is, according to an embodiment, the first spatial beam pattern has a first pointing direction, the second spatial beam pattern has a second pointing direction, and the second pointing direction is different from to the first pointing direction. This is the case for the example in FIG. 5(a) and partly in FIG. 5(b).

In some aspects, the spatial beam patterns differ from each other by having different beam widths. That is, according to an embodiment, the first spatial beam pattern has a first beam width, the second spatial beam pattern has a second beam width, and the second beam width is different from to the first beam width. This is the case for the example in FIG. 5(b).

In some aspects, the spatial beam patterns differ from each other by having different number of beams. That is, according to an embodiment, the first spatial beam pattern is defined by a first set of beams, the second spatial beam pattern is defined by a second set of beams, and there are unequally many beams in the first set of beams and in the second set of beams. This is the case for the example in FIG. 5(b).

One non-limiting example of how these embodiments could be readily combined with the above described P-3 sub-procedure will now be disclosed.

During a beam sweep (either based on reference signals such as CSI-RS or SSB as transmitted in one and the same beam at the TRP 150) performed as part of the P-3 procedure the terminal device 200 sweeps through beams in two orthogonal polarizations. Some different variants of how such a beam sweep could be performed is illustrated at (a), (b) and (c) in FIG. 5 as previously referred to.

Figure 6:
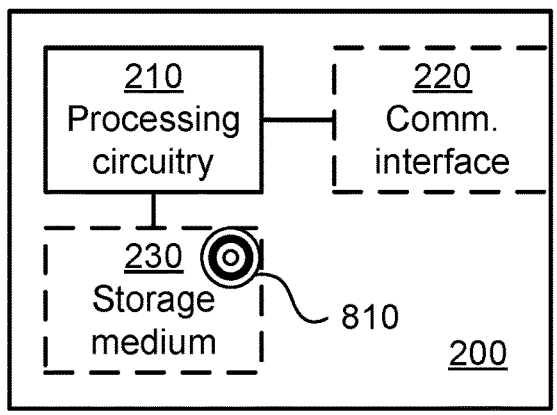
FIG. 6 is a schematic diagram showing functional units of a terminal device according to an embodiment.

FIG. 6 schematically illustrates, in terms of a number of functional units, the components of a terminal device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 810 (as in FIG. 8), e.g. in the form of a storage medium 230. The processing circuitry 210 may further be provided as at least one application specific integrated circuit (ASIC), or field programmable gate array (FPGA).

Particularly, the processing circuitry 210 is configured to cause the terminal device 200 to perform a set of operations, or steps, as disclosed above. For example, the storage medium 230 may store the set of operations, and the processing circuitry 210 may be configured to retrieve the set of operations from the storage medium 230 to cause the terminal device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The terminal device 200 may further comprise a communications interface 220 at least configured for communications with the network node 140 via the TRP 150. As such the communications interface 220 may comprise one or more transmitters and receivers, comprising analogue and digital components. In this respect, the communications interface 220 might comprise, or be operatively connected to, an antenna architecture as described above with reference to FIG. 2.

The processing circuitry 210 controls the general operation of the terminal device 200 e.g. by sending data and control signals to the communications interface 220 and the storage medium 230, by receiving data and reports from the communications interface 220, and by retrieving data and instructions from the storage medium 230. Other components, as well as the related functionality, of the terminal device 200 are omitted in order not to obscure the concepts presented herein.

Figure 7:
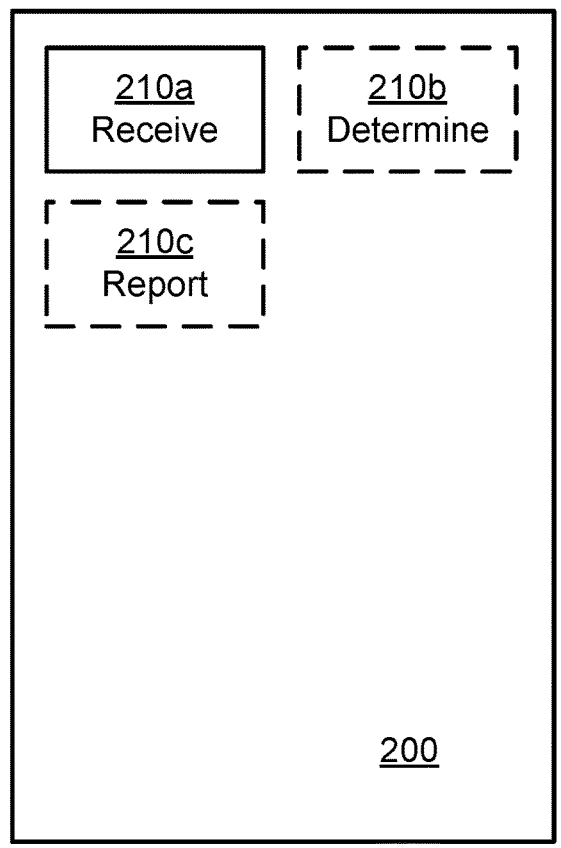
FIG. 7 is a schematic diagram showing functional modules of a terminal device according to an embodiment.

FIG. 7 schematically illustrates, in terms of a number of functional modules, the components of a terminal device 200 according to an embodiment. The terminal device 200 of FIG. 7 comprises a receive module 210a configured to perform step S102. The terminal device 200 of FIG. 7 may further comprise a number of optional functional modules, such as any of a determine module 210b configured to perform step S104, and a report module 210c configured to perform step S106. In general terms, each functional module 210a-210c may in one embodiment be implemented only in hardware and in another embodiment with the help of software, i.e., the latter embodiment having computer program instructions stored on the storage medium 230 which when run on the processing circuitry makes the terminal device 200 perform the corresponding steps mentioned above in conjunction with FIG. 6. It should also be mentioned that even though the modules correspond to parts of a computer program, they do not need to be separate modules therein, but the way in which they are implemented in software is dependent on the programming language used. Preferably, one or more or all functional modules 210a-210c may be implemented by the processing circuitry 210, possibly in cooperation with the communications interface 220 and/or the storage medium 230. The processing circuitry 210 may thus be configured to from the storage medium 230 fetch instructions as provided by a functional module 210a-210c and to execute these instructions, thereby performing any steps as disclosed herein.

Figure 8:
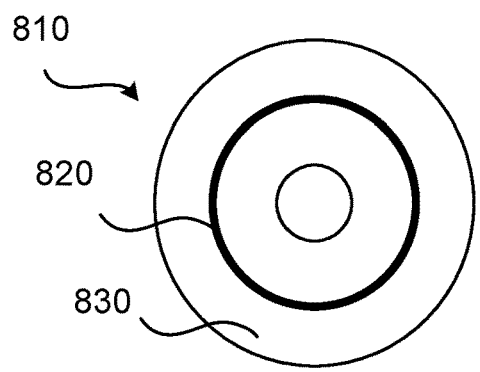
FIG. 8 shows one example of a computer program product comprising computer readable storage medium according to an embodiment.

FIG. 8 shows one example of a computer program product 810 comprising computer readable storage medium 830. On this computer readable storage medium 830, a computer program 820 can be stored, which computer program 820 can cause the processing circuitry 210 and thereto operatively coupled entities and devices, such as the communications interface 220 and the storage medium 230, to execute methods according to embodiments described herein. The computer program 820 and/or computer program product 810 may thus provide means for performing any steps as herein disclosed.

In the example of FIG. 8, the computer program product 810 is illustrated as an optical disc, such as a CD (compact disc) or a DVD (digital versatile disc) or a Blu-Ray disc. The computer program product 810 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 820 is here schematically shown as a track on the depicted optical disk, the computer program 820 can be stored in any way which is suitable for the computer program product 810.

Figure 9:
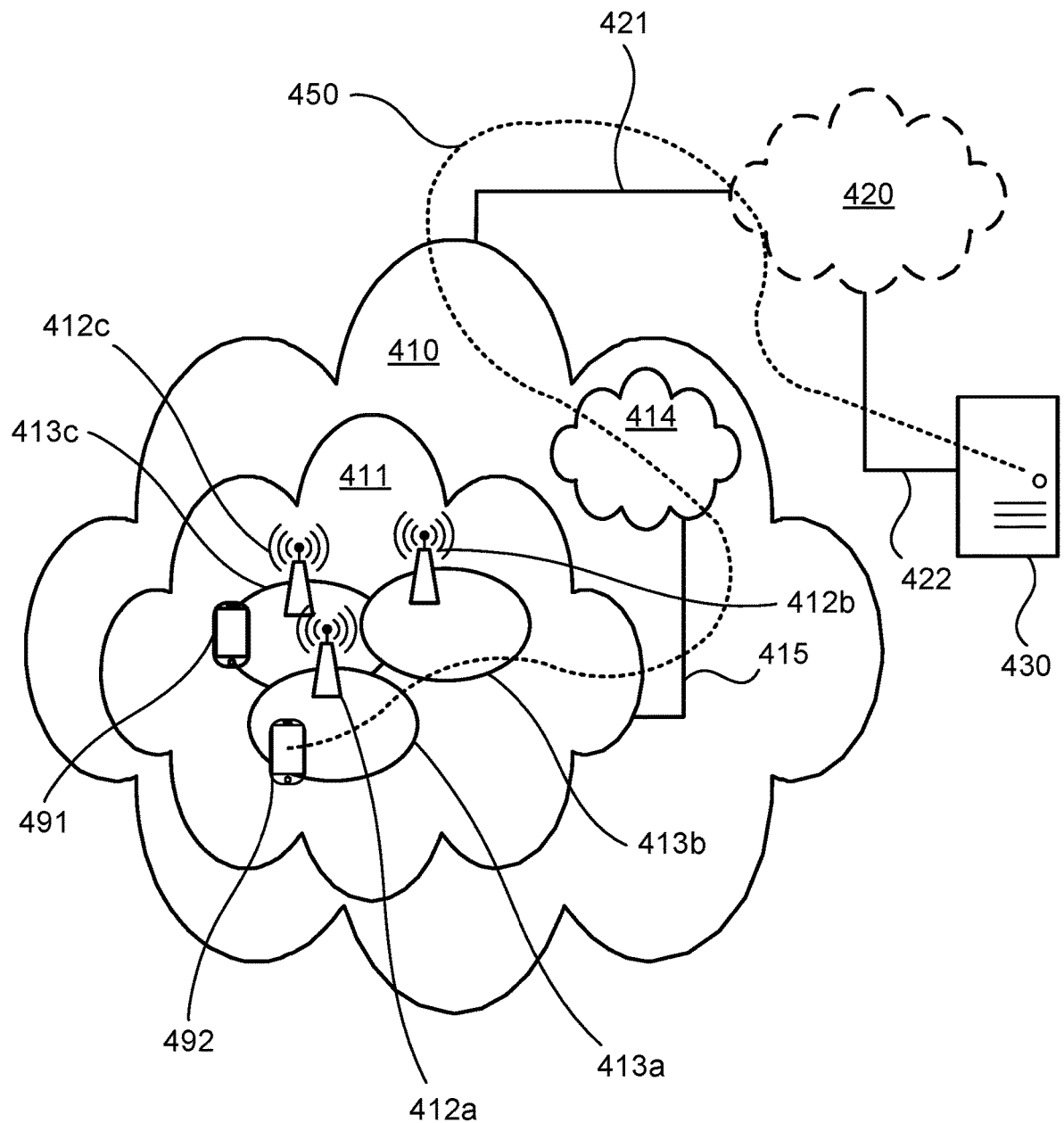
FIG. 9 is a schematic diagram illustrating a telecommunication network connected via an intermediate network to a host computer in accordance with some embodiments.

FIG. 9 is a schematic diagram illustrating a telecommunication network connected via an intermediate network 420 to a host computer 430 in accordance with some embodiments. In accordance with an embodiment, a communication system includes telecommunication network 410, such as a 3GPP-type cellular network, which comprises access network 411, such as radio access network 110 in FIG. 1, and core network 414, such as core network 120 in FIG. 1. Access network 411 comprises a plurality of radio access network nodes 412a, 412b, 412c, such as NBs, eNBs, gNBs (each corresponding to the network node 140 of FIG. 1) or other types of wireless access points, each defining a corresponding coverage area, or cell, 413a, 413b, 413c. Each radio access network nodes 412a, 412b, 412c is connectable to core network 414 over a wired or wireless connection 415. A first UE 491 located in coverage area 413c is configured to wirelessly connect to, or be paged by, the corresponding network node 412c. A second UE 492 in coverage area 413a is wirelessly connectable to the corresponding network node 412a. While a plurality of UE 491, 492 are illustrated in this example, the disclosed embodiments are equally applicable to a situation where a sole UE is in the coverage area or where a sole terminal device is connecting to the corresponding network node 412. The UEs 491, 492 correspond to the terminal device 200 of FIG. 1.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 9 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected UE 491. Similarly, network node 412 need not be aware of the future routing of an outgoing uplink communication originating from the UE 491 towards the host computer 430.

Figure 10:
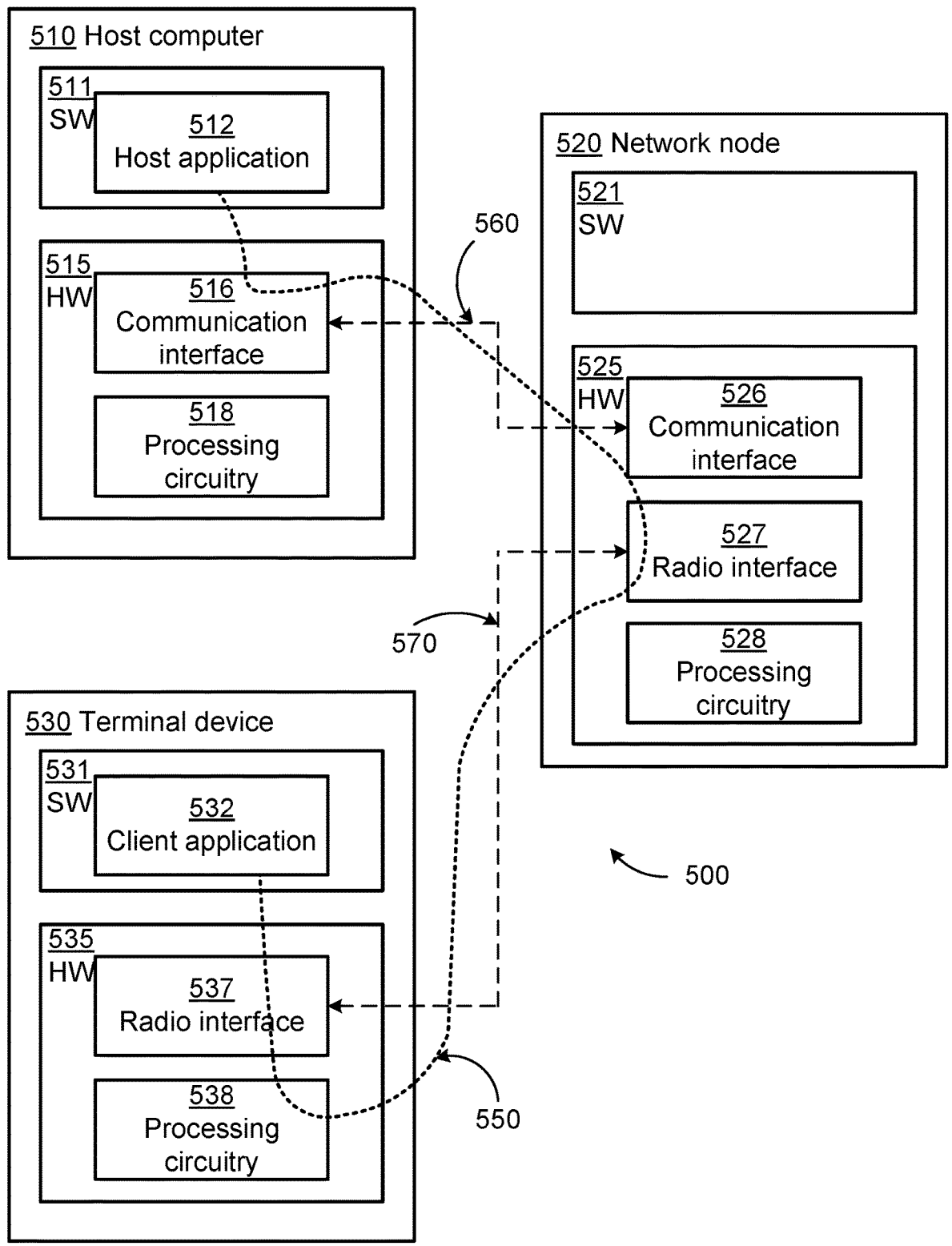
FIG. 10 is a schematic diagram illustrating host computer communicating via a radio base station with a terminal device over a partially wireless connection in accordance with some embodiments.

FIG. 10 is a schematic diagram illustrating host computer communicating via a radio access network node with a UE over a partially wireless connection in accordance with some embodiments. Example implementations, in accordance with an embodiment, of the UE, radio access network node and host computer discussed in the preceding paragraphs will now be described with reference to FIG. 10. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. The UE 530 corresponds to the terminal device 200 of FIG. 1. In providing the service to the remote user, host application 512 may provide user data which is transmitted using OTT connection 550.

Communication system 500 further includes radio access network node 520 provided in a telecommunication system and comprising hardware 525 enabling it to communicate with host computer 510 and with UE 530. The radio access network node 520 corresponds to the network node 140 of FIG. 1. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 10) served by radio access network node 520. Communication interface 526 may be configured to facilitate connection 560 to host computer 510. Connection 560 may be direct or it may pass through a core network (not shown in FIG. 10) of the telecommunication system and/or through one or more intermediate networks outside the telecommunication system. In the embodiment shown, hardware 525 of radio access network node 520 further includes processing circuitry 528, which may comprise one or more programmable processors, application-specific integrated circuits, field programmable gate arrays or combinations of these (not shown) adapted to execute instructions. Radio access network node 520 further has software 521 stored internally or accessible via an external connection.

Communication system 500 further includes UE 530 already referred to. Its hardware 535 may include radio interface 537 configured to set up and maintain wireless connection 570 with a radio access network node serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, radio access network node 520 and UE 530 illustrated in FIG. 10 may be similar or identical to host computer 430, one of network nodes 412a, 412b, 412c and one of UEs 491, 492 of FIG. 9, respectively. This is to say, the inner workings of these entities may be as shown in FIG. 10 and independently, the surrounding network topology may be that of FIG. 9.

In FIG. 10, OTT connection 550 has been drawn abstractly to illustrate the communication between host computer 510 and UE 530 via network node 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and radio access network node 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to radio access network node 520. Such procedures and functionalities may be known and practiced in the art. In certain embodiments, measurements may involve proprietary UE signaling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for polarized reception of reference signals, the method being performed by a terminal device, the terminal device being equipped with an antenna array having dual-polarized antenna elements, the antenna array being connected to a baseband chain in the terminal device, the method comprising:
receiving, during a beam management procedure with a transmission and reception point (TRP), two reference signals transmitted in one OFDM symbol each from the same TRP port within a slot, the two reference signals belonging to a synchronization signal block (SSB) consisting of four OFDM symbols, the SSB being transmitted over one polarization, wherein the two reference signals are received using a filter with a first polarization for a first of the two reference signals and with a second polarization for a second of the two reference signals, and wherein the second polarization is orthogonal to the first polarization.

2. The method of claim 1, further comprising:
determining one common reference signal received power (RSRP) value from measurements as performed by the terminal device on both the two reference signals.

3. The method of claim 1, wherein the SSB in total comprises four reference signals transmitted in one OFDM symbol each from the same TRP port within the slot.

4. The method of claim 3, wherein the one common RSRP value is determined from measurements as performed by the terminal device on all the four reference signals.

5. The method of claim 1, wherein, during the beam management procedure with the TRP, two further reference signals transmitted in one OFDM symbol each from the same TRP port are received, wherein the two further reference signals are received using the filter with the first polarization for a first of the two further reference signals and with the second polarization for a second of the two further reference signals, and wherein one common RSRP value from measurements as performed by the terminal device on both the two further reference signals is determined.

6. The method of claim 5, wherein the two further reference signals are received in a further synchronization signal block.

7. The method of claim 6, further comprising:
determining one common reference signal received power (RSRP) value from measurements as performed by the terminal device on both the two reference signals; and
reporting, to the TRP, which of the SSBs was received with highest RSRP.

8. The method of claim 1, wherein the two reference signals are received using one and the same beam at the terminal device.

9. The method of claim 1, wherein the first of the two reference signals and the second of the two reference signals are received using mutually different spatial beam patterns.

10. The method of claim 9, wherein the first of the two reference signals is received using a first spatial beam pattern, wherein the second of the two reference signals is received using a second spatial beam pattern, and wherein the second spatial beam pattern is different from to the first spatial beam pattern.

11. The method of claim 9, wherein the first spatial beam pattern has a first pointing direction, wherein the second spatial beam pattern has a second pointing direction, and wherein the second pointing direction is different from to the first pointing direction.

12. The method of claim 9, wherein the first spatial beam pattern has a first beam width, wherein the second spatial beam pattern has a second beam width, and wherein the second beam width is different from to the first beam width.

13. The method of claim 9, wherein the first spatial beam pattern is defined by a first set of beams, wherein the second spatial beam pattern is defined by a second set of beams, and wherein there are unequally many beams in the first set of beams and in the second set of beams.

14. The method of claim 1, wherein each of the first polarization and the second polarization is defined by their own polarization state, and wherein which polarization state that defines each of the first polarization and the second polarization depends on rotational orientation of the terminal device.

15. The method of claim 14, wherein which polarization state that defines each of the first polarization and the second polarization remains unchanged as long as the rotational orientation of the terminal device remains unchanged.

16. A terminal device for polarized reception of reference signals, the terminal device being equipped with comprising:
a baseband chain;
an antenna array having dual-polarized antenna elements, the antenna array being connected to the baseband chain; and
processing circuitry, the processing circuitry being configured to cause the terminal device to:
receive, during a beam management procedure with a transmission and reception point (TRP), two reference signals transmitted in one OFDM symbol each from the same TRP port within a slot, the two reference signals belonging to a synchronization signal block (SSB) consisting of four OFDM symbols, the SSB being transmitted over one polarization, wherein the two reference signals are received using a filter with a first polarization for a first of the two reference signals and with a second polarization for a second of the two reference signals, and wherein the second polarization is orthogonal to the first polarization.

17. A non-transitory computer readable medium storing a computer program for polarized reception of reference signals, the computer program comprising computer code which, when run on processing circuitry of a terminal device equipped with an antenna array having dual-polarized antenna elements, the antenna array being connected to a baseband chain in the terminal device, causes the terminal device to:
receive, during a beam management procedure with a transmission and reception point (TRP), two reference signals transmitted in one OFDM symbol each from the same TRP port within a slot, the two reference signals belonging to a synchronization signal block (SSB)

consisting of four OFDM symbols, the SSB being transmitted over one polarization, wherein the two reference signals are received using a filter with a first polarization for a first of the two reference signals and with a second polarization for a second of the two reference signals, and wherein the second polarization is orthogonal to the first polarization.

* * * * *

UNITED STATES PATENT AND TRADEMARK OFFICE
CERTIFICATE OF CORRECTION

PATENT NO. : 11,962,378 B2
APPLICATION NO. : 17/914001
DATED : April 16, 2024
INVENTOR(S) : Petersson et al.

It is certified that error appears in the above-identified patent and that said Letters Patent is hereby corrected as shown below:

In the Specification

In Column 6, Line 49, delete "On" and insert -- One --, therefor.

In Column 8, Line 65, delete "sever" and insert -- severe --, therefor.

In Column 14, Line 64, delete "etc.; the" and insert -- etc. The --, therefor.

In the Claims

In Column 16, Line 35, in Claim 16, delete "device being equipped with" and insert -- device --, therefor.

Signed and Sealed this
Sixteenth Day of July, 2024

Katherine Kelly Vidal
Director of the United States Patent and Trademark Office